United States Patent [19]

Souter et al.

[11] Patent Number: 5,101,758
[45] Date of Patent: Apr. 7, 1992

[54] AIR KNIFE

[75] Inventors: Neil T. Souter, Kingsthorpe; David C. Underwood, New Dunston, both of United Kingdom

[73] Assignee: S. G. Owen (Northampton) Limited, Northampton, England

[21] Appl. No.: 399,568

[22] Filed: Aug. 24, 1989

[30] Foreign Application Priority Data

Aug. 25, 1988 [GB] United Kingdom ............... 8820149

[51] Int. Cl.$^5$ .................... B05C 3/12; B05C 11/06
[52] U.S. Cl. ..................................... 118/63; 118/405
[58] Field of Search ............... 118/62, 63, 65, 404, 118/405, 419–3.2 M, 61

[56] References Cited

U.S. PATENT DOCUMENTS

| | | | |
|---|---|---|---|
| 2,098,852 | 11/1937 | Becker | 118/63 |
| 2,159,297 | 5/1939 | Shover | 118/65 |
| 2,511,415 | 6/1950 | Putnam et al. | 118/63 |
| 3,168,022 | 10/1963 | Church | 118/404 |
| 3,350,248 | 10/1967 | Demarest et al. | 118/405 |
| 3,476,081 | 11/1969 | Facer et al. | 118/405 |
| 3,480,499 | 11/1969 | Paul | 118/405 |
| 3,682,185 | 8/1972 | Murray et al. | 118/405 |
| 3,687,104 | 8/1972 | Capper et al. | 118/405 |
| 3,868,104 | 2/1975 | Hunt et al. | 277/30 |
| 3,924,569 | 12/1975 | Hunter et al. | 118/61 |
| 4,528,935 | 7/1985 | Patil et al. | 118/63 |

FOREIGN PATENT DOCUMENTS

| | | |
|---|---|---|
| 0106521 | 9/1983 | European Pat. Off. |
| 2229630 | 1/1974 | Fed. Rep. of Germany |
| 0887028 | 12/1981 | U.S.S.R. ............... 118/63 |
| 534596 | 3/1941 | United Kingdom |
| 909422 | 10/1962 | United Kingdom |
| 1421996 | 1/1976 | United Kingdom |
| 2026667 | 2/1980 | United Kingdom |
| 2031036 | 4/1980 | United Kingdom |

Primary Examiner—Willard Hoag
Attorney, Agent, or Firm—Spencer & Frank

[57] ABSTRACT

There is disclosed an air knife for preventing transfer of liquid from one container to another. The air knife comprises an expansion chamber having a product inlet opening on to one container and a product outlet opening onto a second container. Around the circumference of the expansion chamber is positioned a distribution chamber. Air is input to the distribution chamber through an air inlet and a large bore inlet and passes around the whole of the annular distribution chamber. Several evenly-spaced small bore inlets allow ingress of air from the distribution chamber into the expansion chamber. The air, at a pressure greater than the fluid outside the product inlet and product outlet is forced out of the product inlet and product outlet thus forcing liquid adhering to an elongate product, such as a strip of components being electroplated, passing from the product inlet through the expansion chamber and out of product outlet, off the elongate product. Product guides extend from the sides of the product inlet and product outlet into the respective containers to guide the elongate product through the expansion chamber.

8 Claims, 3 Drawing Sheets

AIR KNIFE

BACKGROUND OF THE INVENTION

The present invention relates to an air knife, more particularly to an air knife for preventing transfer of liquid from one container to another.

Many industrial processes involve the chemical treatment of articles. Often, this chemical treatment involves two or more steps, each step involving the treatment of the article with a different chemical. When treating discrete articles in such a multistep process, the article to be treated is immersed in a first chemical, removed from the first chemical and dried, and then immersed in a second chemical. The chemicals used are usually liquids.

However, many such multistep processes are applied to elongate articles, or strips of articles, which strips may be separated into discrete articles after the process is complete. A good example of such a process is the electroplating of a strip of components. Such elongate articles or strips of articles are commonly drawn through the first liquid, are dried as they emerge from the first liquid, and are then drawn through the second liquid. This is often a continual process, the drying and immersion in the second liquid taking place on a first portion of the elongate article whilst a portion of the elongate article is still immersed in the first liquid.

An example of such a prior art process is shown in FIG. 1, which shows a transverse cross-sectional view of an air knife according to the prior art.

FIG. 1 shows a wall 1 of a first tank containing a first chemical and a wall 2 of a second tank containing a second chemical, with a space between the two walls 1, 2. The first tank has an aperture 3 in the wall 1 thereof and the second tank has a second aperture 4 in the wall 2 thereof, the first aperture 3 being generally opposed to the second aperture 4. Each aperture 3, 4 has a rubber seal 5 therein, each rubber seal 5 comprising a slit 6 through which an elongate article 7 may pass. Each aperture 3, 4 is positioned above the level of liquid in the tanks.

As shown in FIG. 1, the elongate article 7 is drawn through the first tank in the direction, shown by the arrow 8, out of the slit 6 in the rubber seal 5, contained in the first aperture 3, across the space between the two tank walls 1, 2, through the slit 6 in the rubber seal 5, within the second aperture 4, and into the second tank. Within the space between the walls 1, 2 is positioned air blowing means, such as fans, on either side of the elongate workpiece 7 passing through the space between the tanks. The air blowing means is positioned so as to blow air onto both sides of the elongate article 7 passing between the tanks 1 and 2. Thus, when the elongate article 7 emerges from the first tank, through the slit 6 in the rubber seal 5 of the first aperture 3, the rubber seal 5 in the first aperture 3 will tend to scrape liquid off the elongate article 7. The air, blown by the air blowing means positioned within the space between the walls 1, 2, is intended to blow any remaining liquid off the elongate articles 7. Should the air not blow all remaining liquid off the elongate article 7 the rubber seal 5 in the second aperture 4 is intended to, when the elongate article 7 passes through the slit 6 therein, scrape any residual liquid off the elongate article 7. The rubber seals 5 in the first and second apertures 3, 4 will also tend to prevent egress of liquid from the respective tanks into the space between the walls 1, 2.

This prior art arrangement is known as an air knife, although, of course, any suitable relatively inert gas may be blown at the elongate article 7.

The problem with the air knife currently used is that, despite the rubber seal 5 in the first aperture 3, a relatively large quantity of liquid is still carried by the elongate article 7 out of the first tank. Although much of this liquid is blown off by the air, blown at the elongate article 7 in the space between the walls 1, 2, there is still effective loss of liquid from the first tank 1 and carry over into the tank 2. Thus, liquid carried on the elongate article 7 from the first tank which is not totally blown off by the air or scraped off by the rubber seal 5 in the second aperture 4 may be carried over to the liquid of the second tank.

Another problem is that the air blown onto the elongate article 7 may not, if the liquid in the first tank is a solution, blow all the liquid off the elongate article 7, but will merely dry the solution leaving a thin layer of salt upon the elongate article 7.

It has been estimated by the present inventors that in processes such as the electroplating of components, where gold- or silver-containing liquids are used in the first tank, there can be a 10 to 20% excess of gold or silver dragged over from the first tank, which gold or silver is then either blown or scraped off in the space between the walls 1, 2 or is pulled into the second tank with the elongate article 7. This gold or silver lost from the first tank can be reclaimed by expensive and time-consuming methods, but such methods are so expensive that they are often more costly than the gold or silver which they are intended to reclaim. Accordingly, there is a considerable loss of expensive metals when such a process is used for electroplating a strip of components.

A further problem of the prior art air knife is that there is a considerable loss of space due to the requirement that the first and second tanks must be spaced apart to allow for the positioning of the air blowing means, forming the air knife, therebetween.

SUMMARY OF THE INVENTION

Accordingly, it is an object of the present invention to overcome or at least mitigate the problems mentioned above, found in the prior art.

According to the present invention there is provided an air knife comprising an expansion chamber having a product inlet, a product outlet, and a gas inlet for ingress of gas at greater pressure than fluid surrounding the chamber.

Although the present invention is directed towards an air knife it will be obvious to a person skilled in the art that any suitable inert gas may be used.

Preferably, the gas inlet is directed towards the position at which a product is situated within the chamber, in use. More preferably, the gas inlet is directed towards the position at which a product, in use, passed through the product inlet and/or product outlet.

Preferably the product inlet and/or product outlet comprises means for scraping any residual fluid from a product passing therethrough.

In one embodiment of the present invention, the air knife further comprises a distribution chamber situated around at least a portion of the expansion chamber, the distribution chamber being connected to the expansion chamber by means of the gas inlet. Preferably, the expansion chamber is connected to the distribution chamber by means of several gas inlets evenly spaced around the edge of the expansion chamber and most preferably the expansion chamber is of circular transverse cross section.

In a second embodiment of the present invention, the gas inlet comprises a pipe, located within the expansion chamber, the pipe comprising an aperture therein for ingress of gas into the expansion chamber. Preferably the pipe comprises more than one aperture and most preferably the apertures are directed toward the product inlet and/or product outlet. The gas inlet may comprise more than one pipe.

Preferably, the air knife is positioned in the wall of a container for liquid and most preferably the air knife is positioned in a wall separating two containers for liquid.

Preferably the product is an elongate article and most preferably the product is a strip of articles.

Preferably the gas is air.

FIG. 1 is a schematic drawing of the invention.

For a better understanding of the present invention and how the same may be put into effect, the present invention will now be further described, by way of example only, with reference to the accompanying drawings in which:

FIG. 2 shows a transverse cross-sectional view of an air knife according to one embodiment of the present invention, FIG. 3 shows a diagramatic front view of the air knife of FIG. 2, FIG. 4 shows a transverse cross-sectional view of an air knife according to a second embodiment of the present invention, and FIG. 5 shows a cross-sectional view of the air knife of FIG. 4 taken along lines IV–IV.

DETAILED DESCRIPTION OF THE PREFERRED EMBODIMENTS

Figure 1:
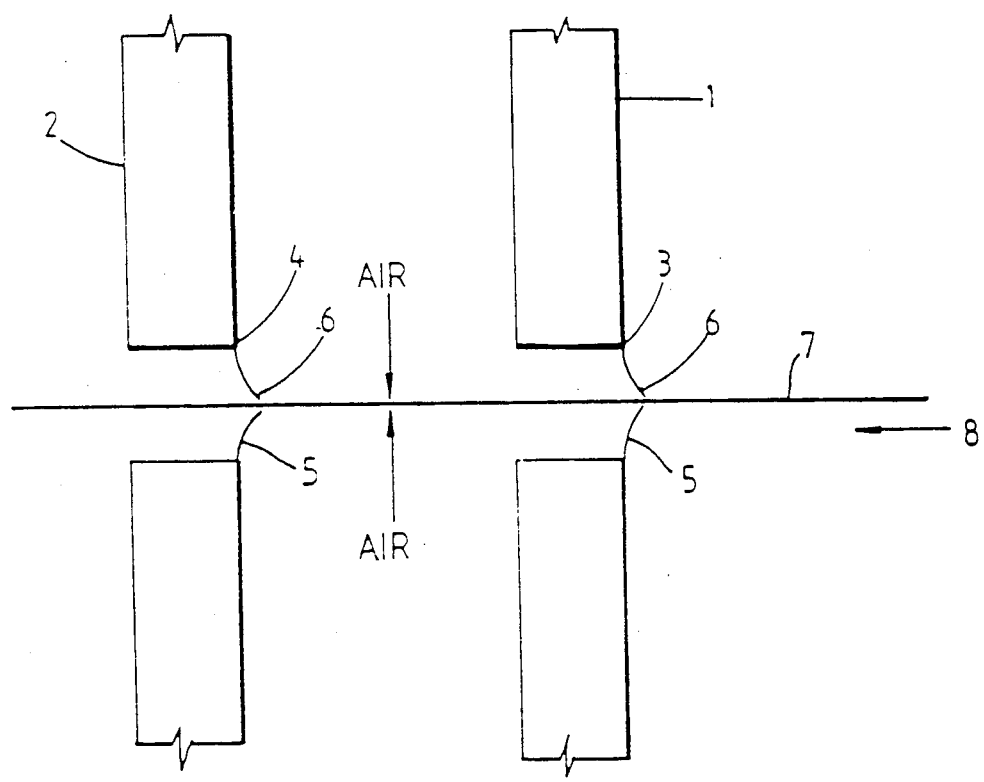
Figure 2:
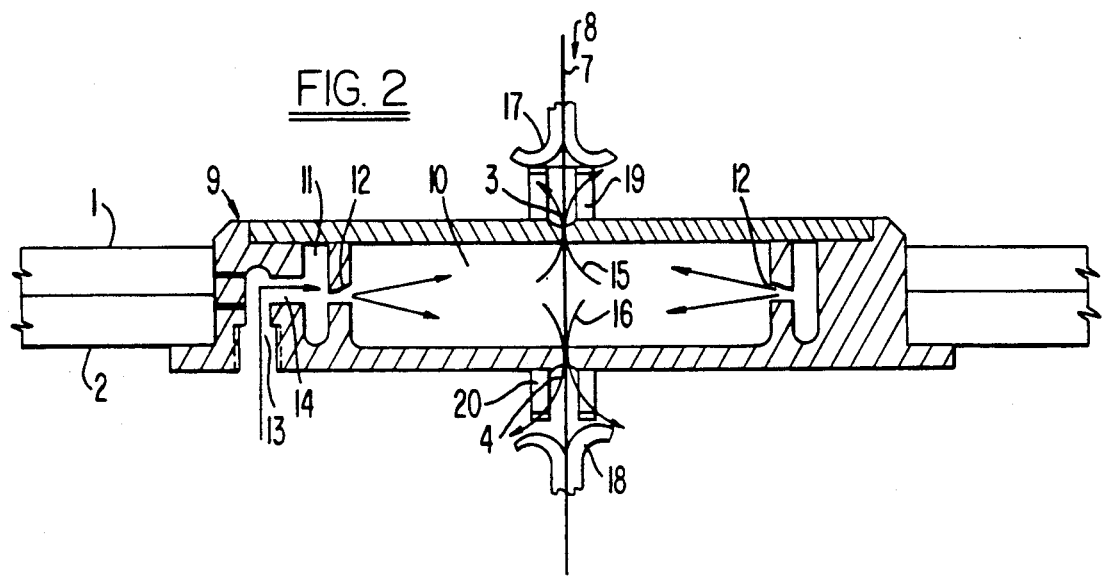

FIG. 2 shows a transverse cross-sectioned view of an air knife according to a first embodiment of the present invention. Two process tanks, one having an outer wall 1, and the other having an outer wall 2, are positioned next to each other so that the outer walls 1, 2 are touching. Positioned within corresponding apertures within the outer walls 1, 2 is an air knife 9. The air knife 9 is usually located in the walls 1, 2 at a position above the level of the liquid in the tanks. The air knife 9 has a circular expansion chamber 10 in the centre thereof and surrounding the circumference of the expansion chamber 10 is an annular distribution chamber 11. The expansion chamber 10 and the distribution chamber 11 are connected by a plurality of evenly spaced small bore inlets 12. A product inlet 3 connects the expansion chamber 10 with the first tank and a product outlet 4 connects the expansion chamber 10 with the second tank. The product inlet 3 and product outlet 4 are dimensioned to allow passage therethrough of an elongate product 7, such as a strip of components. In FIG. 2, the product is shown to move through the air knife 9 in the direction of the arrow 8 but the direction of movement may be reversed in which case the product outlet 4 will become the product inlet and the product inlet 3 will become the product outlet.

The distribution chamber 11 is connected to an air input aperture 13 by means of a single large bore inlet 14.

Air is fed into the air input aperture 13 at a pressure greater than the pressure of the fluid (usually air) outside the product inlet 3 and product outlet 4. The air passes from the air input aperture 13 through the large bore inlet 13 into the distribution chamber 11. The air is forced around the annular distribution chamber 11 and through the evenly-spaced small bore inlets 12, into the expansion chamber 10, ensuring that the air enters the expansion chamber 10 around the whole circumference of the expansion chamber 10. The air, being at a pressure greater than the fluids outside the product inlet 3 and product outlet 4 is forced from the product inlet 3 and the product outlet 4 into the first and second tanks respectively, as shown by arrows 15, 16 respectively, thus forcing the liquid 17, adhering to the elongate product 7 away from the product inlet 3 and product outlet 4 respectively. In this way the liquid 17, 18 is forced off the elongate product 7 and is prevented from entering the expansion chamber 10 of the air knife 9.

This air knife 9 substantially reduces or prevents carry-over of liquid 17 from the first tank into the expansion chamber and into liquid within the second tank into the expansion chamber, thus reducing or preventing any mixing of the liquids in the first and second tanks, and reducing loss of any precious materials from the first and second tanks. The air knife 9 is further positioned in corresponding apertures within the outer walls 1, 2 of the first and second tanks respectively, allowing the first and second tanks to be positioned next to each other without a space therebetween, thus reducing the space required for the processing apparatus.

As can be seen from FIG. 2, if the direction of movement 8 of the elongate product 7 is reversed, the air knife 9 will operate to prevent carry-over of liquid 18 from the second tank to either the air knife 9 or the first tank.

Figure 3:
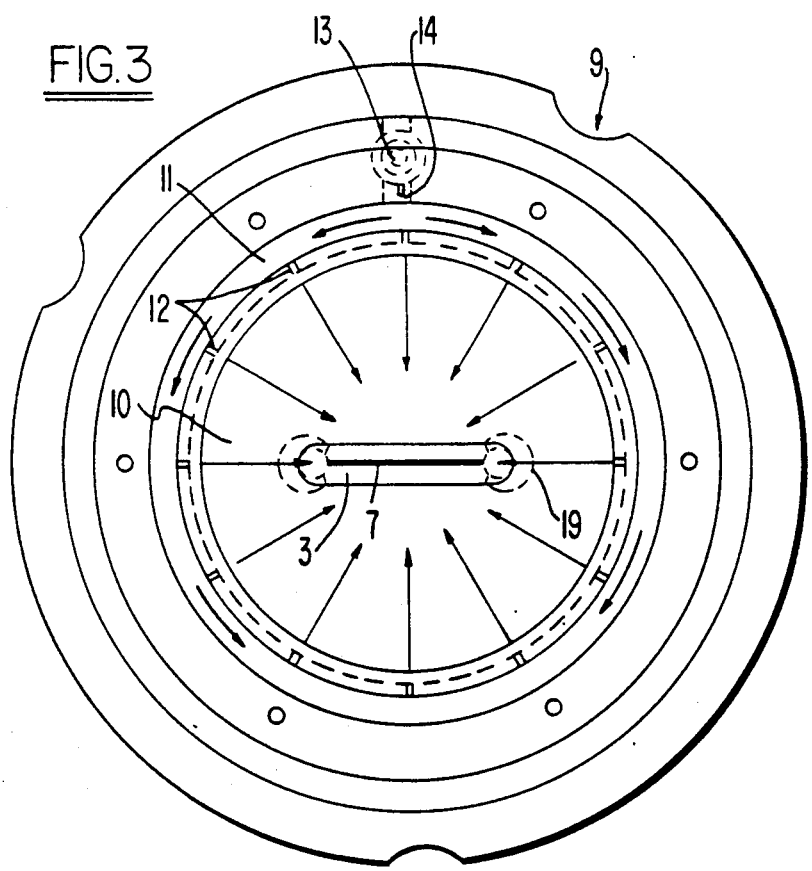

FIG. 3 shows a diagramatic front view of the embodiment shown in FIG. 2 showing the direction of the air within the air knife. As can be seen from FIG. 3 air is directed, by virtue of the plurality of small bore inlets 12, connecting the distribution chamber 11 to the expansion chamber 10, towards all sides of the product inlet 3 and product outlet 4.

The air knife 9 may be positioned below the level of the liquids in the two tanks, forcing air out of all sides of the product inlet 3 and product outlet 4 to maintain full prevention of ingress of liquid 17, 18, from the first and second tanks into the air knife.

As can be seen from FIG. 2 the air knife may further comprise product guides 19, 20 which product guides 19, 20 are lips extending outwardly, into the respective first and second tanks, from the two sides of each of the product inlet 3 and the product outlet 4 to aid guiding of the elongate product 7 through the air knife.

Figure 4:
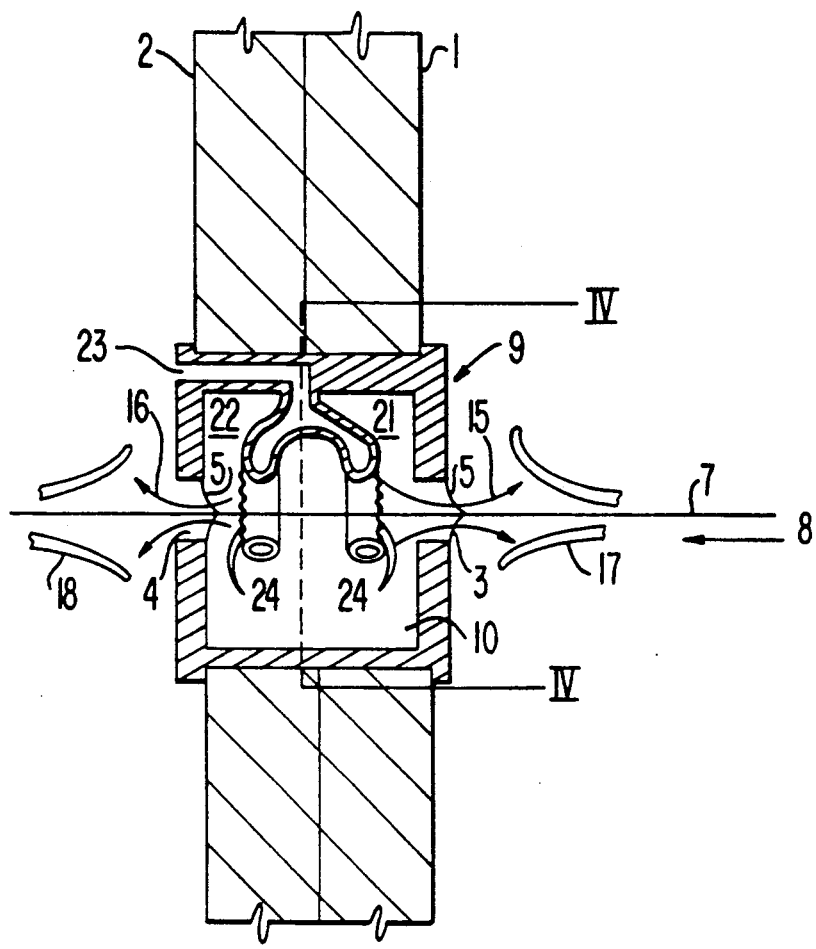
Figure 5:
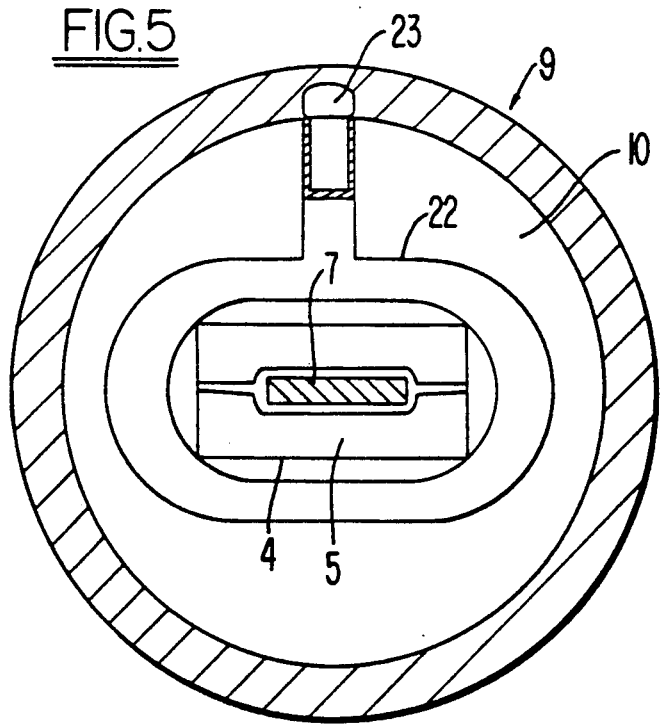

A second embodiment of the present invention is shown in FIGS. 4 and 5. In the Second embodiment of the present invention, the air knife 9 comprises an expansion chamber 10. Within the expansion chamber 10 are positioned two air pipes 21, 22, each connected to a main air inlet pipe 23. Each of the two air pipes 21, 22 are arranged in annular fashion around the respective aperture within the expansion chamber 10, i.e. either the product inlet 3 or the product outlet 4. Each air pipe 21, 22 has therein, a plurality of air holes 24, which air holes 24 are directed towards the respective aperture in the expansion chamber 10, i.e. the product inlet 3 or product outlet 4.

In use, air is fed to the air inlet pipe 23 at a pressure greater than the liquids surrounding the product inlet 3 and product outlet 4. The air then passes into the air pipes 21 and 22 and is forced through the air holes 24.

The air holes 24 are directed towards the respective product inlet 3 or product outlet 4 and the air is thus directed towards the product inlet 3 and the product outlet 4. In this way, air is forced out of the product inlet or the product outlet 4 to push liquid 17, adhering to the elongate product 7, away from the product inlet and off the elongate product 7, as in the first embodiment of the present invention. As with the first embodiment, the direction of movement 8 of the elongate product 7 may be reversed without adjusting the air knife 9 and the air knife 9 may be positioned beneath the level of the liquids in the first and second tanks if so desired.

The second embodiment is particularly useful when the elongate product 7 is a delicate strip such as an etched strip of components. The first embodiment of the present invention may prove too robust for such strips, the pressure of the air entering the expansion chamber 10 being sufficient to damage the strip as the air contacts the strip. In the second embodiment the air is directed straight at the product inlet 3 and/or product outlet 4 and thus causes considerably less damage to any delicate strip passing therethrough.

We claim:

1. An air knife apparatus for preventing transfer of liquid from one container to another, at least the one container including a reservoir for a liquid which is applied to a web passing from the one container to the other container, the two containers having adjacent outer walls, comprising:

an expansion chamber mounted in openings provided in the adjacent outer walls of the two containers, said expansion chamber including a peripheral outer wall and opposing, spaced-apart side walls attached to said peripheral outer wall and having aligned inlet and outlet ports, with the web passing from the one container through the inlet port and into the other container through the outlet port by way of said expansion chamber;

gas nozzle means including gas nozzles spaced about the web passing through said expansion chamber and directed toward at least the inlet port for directing gas streams toward said inlet port for simultaneously preventing liquid from leaking into said expansion chamber through said inlet port and for blowing liquid adhering to the web as it passes through said inlet port back into the one container; and connection means for connecting said gas nozzles to a source of gas for supplying said gas nozzles with gas at a pressure greater than fluid pressure existing in the containers outside of said inlet and outlet ports.

2. Apparatus according to claim 1, wherein said expansion chamber has a circular cross section in a plane parallel to the outer walls of the containers and includes at least one radially extending flange for attaching said expansion chamber to an outer wall of one of the containers.

3. Apparatus according to claim 1, and further comprising scraping means disposed in at least said inlet port for scraping residual liquid from the web passing through said inlet port.

4. Apparatus according to claim 1, and further comprising a distribution chamber disposed around at least a portion of said expansion chamber, said distribution chamber being connected to the source of gas by way of said connection means and communicating with said expansion chamber by way of said nozzles which are disposed in the peripheral outer wall of said expansion chamber.

5. Apparatus according to claim 4, wherein said nozzles are evenly spaced around the peripheral wall of said expansion chamber.

6. Apparatus according to claim 1, and further including at least one pipe disposed inside said expansion chamber and connected to the source of gas by way of said connection means, said nozzles being disposed in the wall of said at least one pipe.

7. Apparatus according to claim 6, wherein said at least one pipe comprises a plurality of pipes with nozzles directed at said inlet port and said outlet port, respectively.

8. Apparatus according to claim 1, wherein the adjacent outer walls of the containers comprise a common wall and said expansion chamber is disposed in an opening of the common outer wall.

* * * * *